US012695776B2

(12) United States Patent
Krakover et al.

(10) Patent No.: US 12,695,776 B2
(45) Date of Patent: Jul. 28, 2026

(54) METHOD OF CYBER SECURITY AND SYSTEM THEREOF

(71) Applicant: Elta Systems Ltd., Ashdod (IL)

(72) Inventors: Noam Krakover, Ramat HaSharon (IL); Camila Edry, Ashdod (IL)

(73) Assignee: Elta Systems Ltd., Ashdod (IL)

( * ) Notice: Subject to any disclaimer, the term of this patent is extended or adjusted under 35 U.S.C. 154(b) by 101 days.

(21) Appl. No.: 18/681,335

(22) PCT Filed: Jun. 27, 2022

(86) PCT No.: PCT/IL2022/050686
§ 371 (c)(1),
(2) Date: Feb. 5, 2024

(87) PCT Pub. No.: WO2023/021499
PCT Pub. Date: Feb. 23, 2023

(65) Prior Publication Data
US 2024/0340303 A1     Oct. 10, 2024

(30) Foreign Application Priority Data

Aug. 16, 2021     (IL) .......................................... 285660

(51) Int. Cl.
*H04L 9/40* (2022.01)
(52) U.S. Cl.
CPC ................................ *H04L 63/1433* (2013.01)
(58) Field of Classification Search
None
See application file for complete search history.

(56) References Cited

U.S. PATENT DOCUMENTS 7,926,113 B1 * 4/2011 Gula ................... H04L 63/1425
726/25
9,411,965 B2 8/2016 Giakouminakis et al.
(Continued)

FOREIGN PATENT DOCUMENTS

EP 3188436 A1 7/2017
EP 3793166 A1 3/2021
WO 2021044408 A2 3/2021

OTHER PUBLICATIONS

Tundis et al. "An exploratory analysis on the impact of Shodan scanning tool on the network attacks" Aug. 17, 2021, ARES '21: Proceedings of the 16th International Conference on Availability, Reliability and Security Article No. 39, pp. 1-10. (Year: 2021).*
(Continued)

*Primary Examiner* — Kaveh Abrishamkar
(74) *Attorney, Agent, or Firm* — Ballard Spahr LLP

(57) ABSTRACT

A computerized cyber security system for generating a consolidated risk score of an entity, usable for analyzing the vulnerabilities of plurality of entities to cyber risks. The system is configured to determine a first set of IP addresses for scanning and then scan the first set of IP addresses, and for each IP address identify a risk and extract corresponding risk criticality score, and determining a misconfiguration score. The system is further configured to map a second set of IP addresses an entity of interest and provide IP address criticality weights associated with the second set of IP addresses. The system is further configured to provide an entity criticality weight associated with the entity of interest.

19 Claims, 4 Drawing Sheets

(56) References Cited

U.S. PATENT DOCUMENTS

| | | | |
|---|---|---|---|
| 9,501,647 B2* | 11/2016 | Yampolskiy | H04L 61/25 |
| 12,244,635 B1* | 3/2025 | Bonfield | H04L 63/1433 |
| 2004/0015728 A1 | 1/2004 | Cole et al. | |
| 2005/0086499 A1* | 4/2005 | Hoefelmeyer | G06F 21/567 |
| | | | 713/188 |
| 2005/0229255 A1* | 10/2005 | Gula | H04L 63/1433 |
| | | | 726/23 |
| 2008/0092237 A1* | 4/2008 | Yoon | G06F 21/577 |
| | | | 726/25 |
| 2012/0185945 A1* | 7/2012 | Andres | G06F 21/568 |
| | | | 726/25 |
| 2016/0171415 A1 | 6/2016 | Yampolskiy et al. | |
| 2016/0173521 A1* | 6/2016 | Yampolskiy | G06Q 10/06393 |
| | | | 726/25 |
| 2017/0187745 A1* | 6/2017 | Ng | H04L 63/1433 |
| 2018/0124094 A1 | 5/2018 | Hamdi | |
| 2020/0228563 A1* | 7/2020 | Yampolskiy | H04L 63/1425 |
| 2020/0314134 A1* | 10/2020 | Izrael | G06F 21/554 |
| 2020/0358806 A1 | 11/2020 | Connell et al. | |
| 2020/0374316 A1 | 11/2020 | Crabtree et al. | |
| 2020/0412758 A1 | 12/2020 | Trivellato et al. | |
| 2021/0014263 A1* | 1/2021 | Soroush | G06F 21/57 |

OTHER PUBLICATIONS

International Search Report and Written Opinion for International Application No. PCT/IL2022/050686 mailed Sep. 19, 2022.

* cited by examiner

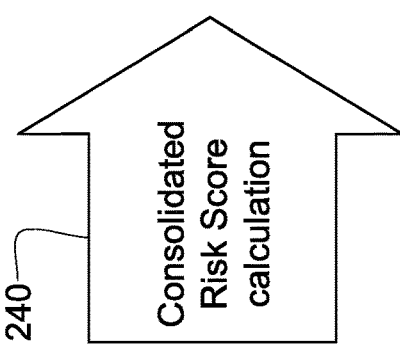
240
Consolidated Risk Score calculation
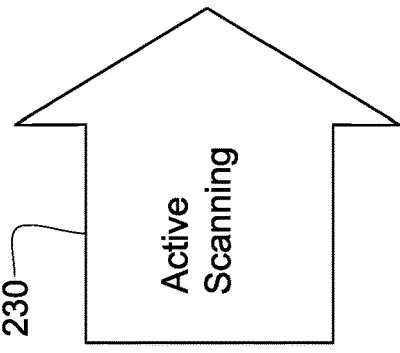
230
Active Scanning
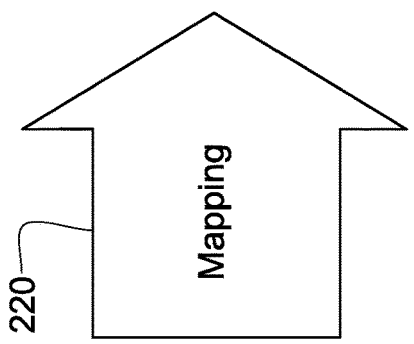
220
Mapping
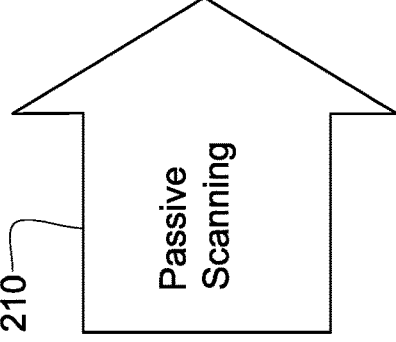
210
Passive Scanning
Fig. 2

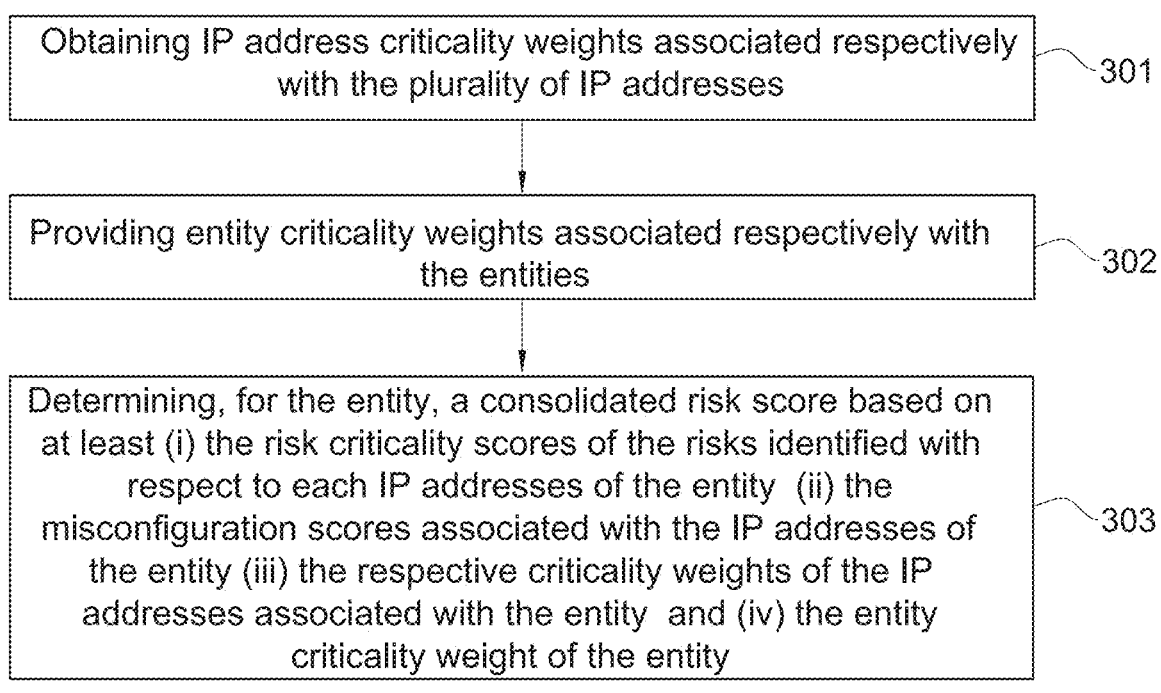

Obtaining IP address criticality weights associated respectively with the plurality of IP addresses ⟋ 301

Providing entity criticality weights associated respectively with the entities ⟋ 302

Determining, for the entity, a consolidated risk score based on at least (i) the risk criticality scores of the risks identified with respect to each IP addresses of the entity (ii) the misconfiguration scores associated with the IP addresses of the entity (iii) the respective criticality weights of the IP addresses associated with the entity and (iv) the entity criticality weight of the entity ⟋ 303

Fig. 3

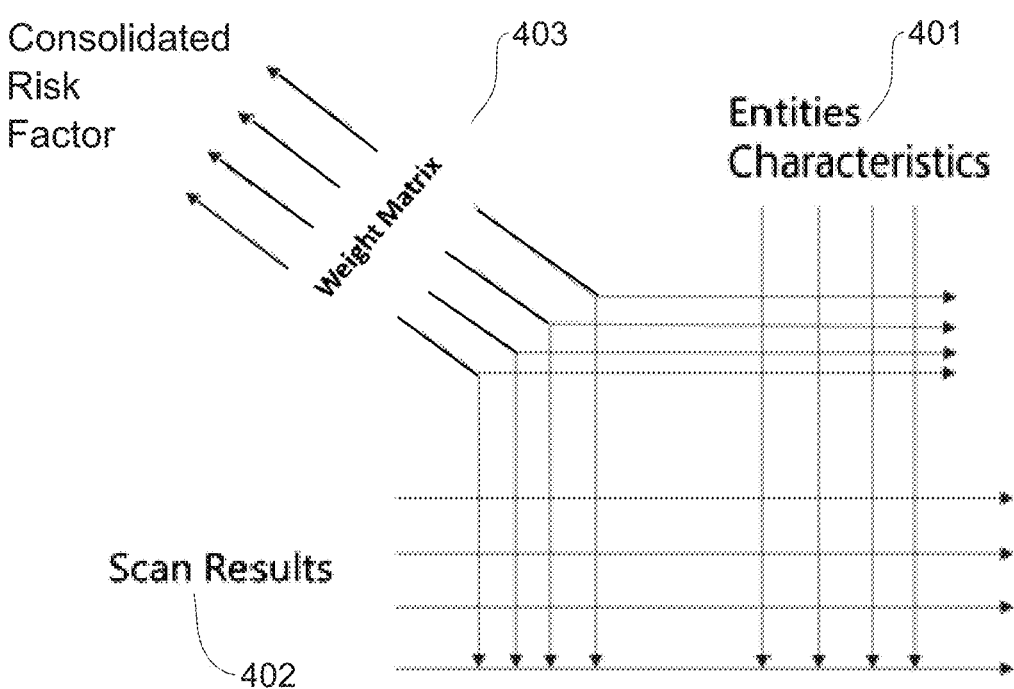

Consolidated Risk Factor

403

Entities 401

Characteristics

Weight Matrix

Scan Results

METHOD OF CYBER SECURITY AND SYSTEM THEREOF

TECHNICAL FIELD

The presently disclosed subject matter relates to cyber security and, more particularly, to determining the potential risks to cyber-attacks.

BACKGROUND

Cyber attackers search continually for vulnerabilities, misconfigurations and/or other factors (referred to generally as vulnerabilities) to serve them as entry points for attacking organizations and systems (referred to more generally as entities). Proactively identifying and mapping such exposed entities (each typically has a set of IP addresses) is a key element for cyber resilience.

There is a need in the art to provide for a new technique for mapping and analysing the cyber risks that are derived from vulnerabilities across entities.

The references cited above teach background information that may be applicable to the presently disclosed subject matter. Therefore, the full contents of these publications are incorporated by reference herein where appropriate for appropriate teachings of additional or alternative details, features and/or technical background.

GENERAL DESCRIPTION

As specified above, cyber attackers search continually for vulnerabilities, misconfigurations and/or other factors to serve them as entry points for attacking systems and organizations. Proactively identifying and analysing risks that are derived from vulnerabilities and misconfigurations across entities (such as organizations, e.g. a national electric company), where each entity typically has a set of IP addresses, is an important element for cyber resilience.

Intuitively, the system and method according to certain embodiments of the invention, enable entities to be alerted if any such weakness exists in their networks, before it is utilized by adversaries. In accordance with certain embodiments, on a national/state level it enables cyber authorities to map the risks of all the organizations under their responsibility as part of Cyber Situational Awareness.

In the context of the presently disclosed subject matter the term "entity" should be extensively construed to include organization(s) (such as banks, electric corporations, water plantations, security related companies, governmental institutes, private companies such as grocery chains, and/or any other organizations). In accordance with certain embodiments, the term entity may also refer to a group of one or more sub-entities, possibly in a hierarchical structure. The sub entities may be characterized by different geographic location(s) and/or different functionalities, and/or by other parameters. For instance, the electric corporate entity may have sub entities of plantations located in different geographical locations and possibly one of more of the sub entities may, in turn, include sub entities located in different geographical sites, giving rise by this example to an organization with a hierarchy of three layers of sub entities (all embraced by the term entity). In accordance with certain embodiments, the entity and/or geographically dispersed sub-entities may be characterized by different functionalities. For instance, the electric corporation may have a sub-entity for manufacturing electricity, and another sub-entity for distribution of the manufactured electricity (whether co-located or located in a different geographical location), and so forth.

Note that the invention is not bound by these examples. Note that the entity (or any of its associated group of sub-entities, if applicable) may be associated with one or more IP addresses, all as will be explained in greater detail below. As is well known, each IP address may be associated with a network asset, whether physical or virtual, such as a physical printer or virtual server, just to mention a few.

In accordance with certain embodiments of the presently disclosed subject matter, a consolidated risk score is calculated for each entity (by identifying risks derived from vulnerabilities and misconfigurations, and assessing the level of exploitability by potential attackers. Being focused on the exploitable vulnerabilities, the consolidated risk score reflects the actual threat through the eyes of the attacker.

Since entities are not equal, and each entity has its mission and technologies that aim to support its mission, the risks to different entities are not equal, and it is highly important to evaluate the risks while taking into account the entity's characteristics, and not based on a general scale. For instance, an entity such as bank with sensitive IS and IT systems is at higher risk to cyber-attacks than an entity such as a site of a grocery store chain. The different characteristics may be reflected by applying entity criticality weight (say, falling in the range of 1-10). Similarly, different IP addresses (that are associated with the same entity, or different entities) may have different IP characteristics such as IP criticality weight (say, falling in the range of 1-10). For instance, an IP of a billing site of an entity may have a larger weight than an IP of a marketing site. IP address criticality weight and entity criticality weight, all will be explained in greater detail below. Note that, typically, in accordance with certain embodiments, the entity criticality weight of an entity and IP criticality weight of an IP address are pre-defined.

In accordance with certain embodiments, the attacker's view across multiple stages of the cyber kill chain is simulated by detecting vulnerabilities on e.g. IT, IoT and OT networks and systems and misconfigurations in the systems (e.g. unused services, unpatched systems, and outdated systems which may be manifested as "closed" or "open" ports).

In accordance with certain embodiments, vulnerabilities stand for detected known risks (e.g. CVE-2019-8454, being indicative of a scenario in which "a local attacker can create a hard-link between a file to which the Check Point Endpoint Security client for Windows before E80.96 writes and another BAT file, then, by impersonating the WPAD server, the attacker can write BAT commands into that file that will later be run by the user or the system", where each risk is associated with a predefined risk criticality score (e.g. a score that falls in the range of 1-10, depending on the severity and vulnerability of the risk to a cyber attack; the specified CVE-2019-8454 risk is associated with a criticality score of 7). Note that the predefined risk criticality scores that are associated with the respective known risks may be obtained, e.g. from the National Institute of Standards and Technology (NIST) data source. The invention is by no means bound by this data source.

In accordance with certain embodiments, and as will be explained in greater detail below, known per se scan tools that are configured to perform a wide range of passive and proactive scans across a range of IP addresses are used. Then, the scan results (e.g., vulnerabilities and misconfigurations manifested, respectively as risk criticality scores and misconfigurations scores) are correlated with the entities' characteristics and the IP characteristics (of the IP addresses associated with the entities) to calculate a consolidated risk score of each entity. All this is orchestrated as an automatic process, allowing continuous exposure monitoring and timely alerts.

In accordance with certain embodiments, there is provided an open platform that provides the customer to customize it, and add new scanning tools to address specific threats by using the system API and SDK (software development kit). The API may improve the capability to adopt new scans that will address new threats and new vulnerabilities including so called "zero days scenarios", which were not published. The latter refers to vulnerabilities that are not published, however the security team is aware of those vulnerabilities and needs to validate that the entity is protected against risks that are derived from those vulnerabilities, and therefore they are also scanned.

According to one aspect of the presently disclosed subject matter there is provided a computerized cyber security system for generating a consolidated risk score of an entity, usable for analysing the vulnerabilities of plurality of entities to cyber risks, the system comprising a processor and memory circuitry (PMC) configured to:

determine a first set of IP addresses for scanning;

scan the first set of IP addresses, and for each IP address in the set, and perform, including:

(i) identify at least one risk and extract corresponding at least one risk criticality score, wherein each risk criticality score is informative of the vulnerability of network assets associated with the IP address to the risk;

(ii) determining a misconfiguration score being informative of the vulnerability of network assets associated with the IP address to a misconfiguration;

map a second set of IP addresses, of the first set, to at least one entity of interest, wherein each one of the entities of interest is associated with a respective sub-set of IP addresses of the second set;

provide IP address criticality weights associated respectively with the second set of IP addresses, each IP address criticality weight being informative of the IP address's sensitivity to cyber threats relative to the sensitivity of other IP addresses to the cyber threats;

provide an entity criticality weight associated respectively with the at least one entity of interest; the entity criticality weight being informative of the entity's sensitivity to cyber threats relative to the sensitivity of other entities to cyber threats;

for each entity of interest, determine an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, and (iv) the entity criticality weight of the entity of interest, thereby obtaining a plurality of entity consolidated risk scores associated with respective entities of interest. In addition to the above features, the system according to this aspect of the presently disclosed subject matter can comprise one or more of features (i) to (ix) listed below, in any desired combination or permutation which is technically feasible:

(i) wherein, for each entity of interest, the PMC is configured to determine the IP risk scores of respective IP addresses associated with the entity of interest, wherein each IP address risk score of an IP address is determined by combining at least (i) the risk criticality scores associated with the IP address (ii) the misconfiguration score associated with the IP address, and (iii) IP criticality weight associated with the IP address, and wherein the PMC is further configured to determine the consolidated risk score per each entity of interest by combining the determined IP address risk scores of the respective IP addresses that are associated with the entity and (iv) entity criticality weight of the entity of interest.

(ii) wherein said PMC is further configured to actively scan said second set of mapped IP addresses by utilizing additional information derived from the mapped IP address to the entity of interest and the entity operator's consent scanning the IP address, to thereby enhance said risk criticality scores and misconfigurations scores.

(iii) wherein the scanning is performed by at least one scan tool each configured to obtain a subset of the set of risks and wherein each scan tool is associated with a respective tool weight, being informative of the reliability of the tool in detecting risks, and wherein the determining the entity consolidated risk score is further based on (v) the corresponding tool weight of the tool that was used for the scanning.

(iv) wherein a tool of the tools is Shodan.

(v) wherein each IP address is associated with a plurality of ports and wherein the scan includes determining a respective port value for each scan port, wherein each port value is informative of whether the "open ports" comply with a policy, and wherein the misconfiguration associated with an IP address is determined by combining the port values of the ports associated with the IP address.

(vi) wherein the combining includes using one or more of the following functions: average, weighted average, sum, and max.

(vii) wherein the first set of IP addresses is obtained using at least a national ISP data source.

(viii) wherein the mapping utilizes at least the WhoIs and DNS repository data sources.

(ix) wherein the risk criticality scores that are associated with the respective known risks comply with the National Institute of Standards and Technology (NIST) data source.

According to another aspect of the presently disclosed subject matter there is provided a computerized cyber security method for generating a consolidated risk score of an entity, usable for analysing the vulnerabilities of plurality of entities to cyber risks, the method comprising:

(a) determining a first set of IP addresses for scanning;

(b) scanning the first set of IP addresses, and for each IP address in the set, and perform, including:

(i) identify at least one risk, and extract corresponding at least one risk criticality score, wherein each risk criticality score is informative of the vulnerability of network assets associated with the IP address to the risk;

(ii) determining a misconfiguration score being informative of the vulnerability of network assets associated with the IP address to a misconfiguration;

(c) mapping a second set of IP addresses, of the first set, to at least one entity of interest, wherein each one of the entities of interest is associated with a respective subset of IP addresses of the second set;

(d) providing IP address criticality weights associated respectively with the second set of IP addresses; each IP address criticality weight being informative of the IP address's sensitivity to cyber threats relative to the sensitivity of other IP addresses to the cyber threats;

(e) providing an entity criticality weight associated respectively with the at least one entity of interest; the entity criticality weight being informative of the entity's sensitivity to cyber threats relative to the sensitivity of other entities to cyber threats; and for each entity of interest, (f) determining an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, and (iv) the entity criticality weight of the entity of interest, thereby obtaining a plurality of entity consolidated risk scores associated with respective entities of interest.

This aspect of the disclosed subject matter can comprise one or more of features (i) to (ix) listed below with respect to the system, mutatis mutandis, in any desired combination or permutation which is technically feasible:

(i) for each entity of interest, determining IP risk scores of respective IP addresses associated with the entity of interest, wherein each IP address risk score of an IP address is determined by combining at least (i) the risk criticality scores associated with the IP address (ii) the misconfiguration score associated with the IP address, and (iii) IP criticality weight associated with the IP address, and determining the consolidated risk score per for each entity of interest by combining the determined IP address risk scores of the respective IP addresses that are associated with the entity and (iv) entity criticality weight of the entity of interest.

(ii) actively scanning the second set of mapped IP addresses by utilizing additional information derived from the mapped IP address to the entity of interest and the entity operator's consent scanning the IP address, to thereby enhance the risk criticality scores and misconfiguration scores.

(iii) wherein the scanning is performed by at least one scan tool each configured to obtain a subset of the set of risks and wherein each scan tool is associated with a respective tool weight, being informative of the reliability of the tool in detecting risks, and wherein the determining the entity consolidated risk score is further based on the corresponding tool weight of the tool that was used for the scanning.

(iv) wherein a tool of the tools is Shodan.

(v) wherein each IP address is associated with a plurality of ports and wherein the scanning includes determining a respective port value for each scan port, wherein each port value is informative of whether the "open ports" comply with a policy, and wherein the misconfiguration associated with an IP address is determined by combining the port values of the ports associated with the IP address.

(vi) wherein the combining includes using one or more of the following functions: average, weighted average, sum, and max.

(vii) wherein the first set of IP addresses is obtained using at least a national ISP data source.

(viii) wherein the mapping utilizes at least the WhoIs and DNS repository data sources.

(ix) wherein the risk criticality scores that are associated with the respective known risks comply with the National Institute of Standards and Technology (NIST) data source.

According to another aspect of the presently disclosed subject matter there is provided a non-transitory program storage device readable by a computer, tangibly embodying computer readable instructions executable by the computer to perform a method of generating a consolidated risk score of an entity, usable for analysing the vulnerabilities of plurality of entities to cyber risks, the method comprising:

(a) determining a first set of IP addresses for scanning;

(b) scanning the first set of IP addresses, and for each IP address in the set, perform, including:

(i) identify at least one risk and extract corresponding at least one risk criticality score, wherein each risk criticality score is informative of the vulnerability of network assets associated with the IP address to the risk;

(ii) determining a misconfiguration score being informative of the vulnerability of network assets associated with the IP address to a misconfiguration;

(c) mapping a second set of IP addresses, of said first set, to at least one entity of interest, wherein each one of the entities of interest is associated with a respective subset of IP addresses of the second set;

(d) providing IP address criticality weights associated respectively with the second set of IP addresses; each IP address criticality weight being informative of the IP address's sensitivity to cyber threats relative to the sensitivity of other IP addresses to the cyber threats;

(e) providing an entity criticality weight associated respectively with the at least one entity of interest; the entity criticality weight being informative of the entity's sensitivity to cyber threats relative to the sensitivity of other entities to cyber threats; and for each entity of interest, (f) determining an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, and (iv) the entity criticality weight of the entity of interest, thereby obtaining a plurality of entity consolidated risk scores associated with respective entities of interest.

This aspect of the disclosed subject matter can comprise one or more of features (i) to (ix) listed above with respect to the method, mutatis mutandis, in any desired combination or permutation which is technically feasible.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 2 illustrates a generalized flow-chart of a sequence of operations performed in a cyber security system, in accordance with certain embodiments of the presently disclosed subject matter;

FIG. 3 illustrates a generalized flow-chart of a sequence of operations performed in a cyber security system for calculating a consolidated risk score, in accordance with certain embodiments of the presently disclosed subject matter;

FIG. 4 illustrates graphically a consolidated risk score calculation paradigm, in accordance with certain embodiments of the presently disclosed subject matter.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "determining", "calculating", "identifying", "performing", "mapping" or the like, refer to the action(s) and/or process(es) of a computer that manipulate and/or transform data into other data, said data represented as physical, such as electronic, quantities and/or said data representing the physical objects. The term "computer" (including processor and memory circuitry (PMC), shown, e.g. in FIG. 1) should be expansively construed to cover any kind of hardware-based electronic device or devices with data processing capabilities.

The terms "non-transitory memory" and "non-transitory storage medium" used herein should be expansively construed to cover any volatile or non volatile computer memory suitable to the presently disclosed subject matter. The operations in accordance with the teachings herein may be performed by a computer specially constructed for the desired purposes, or by a general-purpose computer specially configured for the desired purpose by a computer program stored in a non-transitory computer-readable storage medium.

Figure 1:
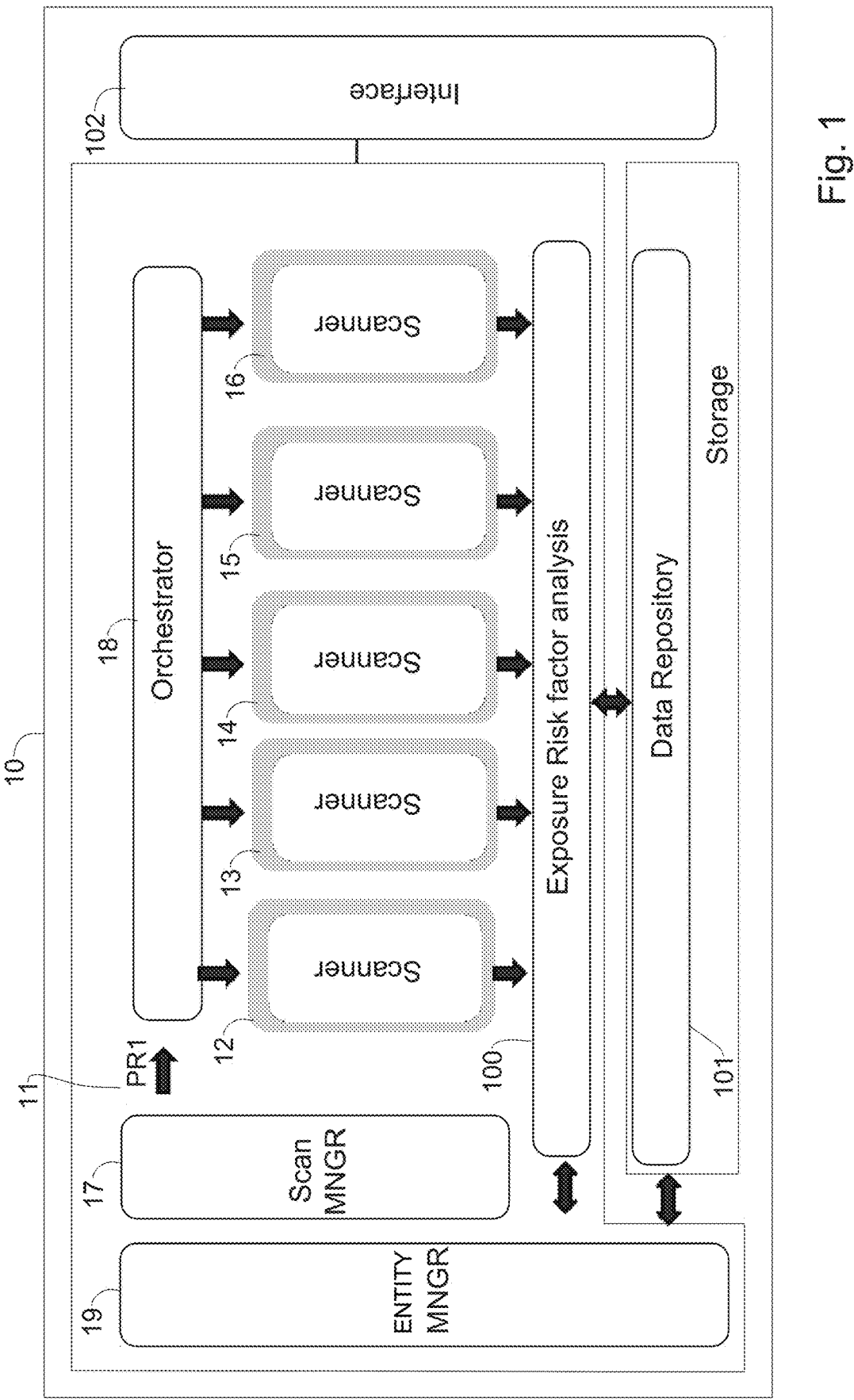
FIG. 1 illustrates a functional block diagram of a cyber security system, in accordance with certain embodiments of the presently disclosed subject matter.

The term cyber security system used in this patent specification should be expansively construed to cover using a PMC (a processor and memory circuitry), as exemplified in FIG. 1 and throughout the specification.

Embodiments of the presently disclosed subject matter are not described with reference to any particular programming language. It will be appreciated that a variety of programming languages may be used to implement the teachings of the presently disclosed subject matter as described herein.

Note that throughout the description, whenever reference is made to a given term that represents data or information, it may be construed, if applicable, to embrace also data informative of the term, including but not limited to different representations and formats thereof, derivatives thereof, and so forth. For instance, when reference is made to the term "analog", it may embrace, if applicable, digital representation thereof, or, by another non-limiting example, be coded from a term, and others.

Bearing this in mind, attention is drawn to FIG. 1, illustrating schematically a cyber security system 10 in accordance with certain embodiments of the presently disclosed subject matter. The system 10 includes a processor and memory circuitry (PMC) 11 which is configured to provide all processing necessary for operating the cyber security system 10 as further detailed below, and comprises a processor (not shown separately) and a memory (not shown separately). The processor of PMC 11 can be configured to execute several functional modules in accordance with computer-readable instructions implemented on a non-transitory computer-readable memory comprised in the PMC. Such functional modules are referred to hereinafter as comprised in the PMC.

The functional modules operatively coupled therebetween, may include Scanner Modules (of which 12-16 are depicted in FIG. 1), possibly COTS (commercial off the shelf) and/or proprietary built services and tools which may be used by the PMC to scan the network and obtain scan results, which will be later analysed for determining consolidated risk scores across entities (all as will be explained in greater detail below). Still further, Scanning Manager module 17 may be configured to manage the scan profiles and associated information related to the scan definitions, as will be demonstrated with reference to FIG. 2.

The Scanning Orchestrator Module 18 may be configured to synchronize and operate the scanning tools according to the scan definitions entered to the Scanning Manager. The Entity Manager Module 19 may be configured to maintain the list of mapped organizations (being an example of respective entities) and their related information, and may serve for mapping the scanned IP addresses to entities.

Still further, the Risk Factor Analysis Module 100 may be configured to calculate the consolidated risk scores, all as will be explained in greater detail below.

As further shown in FIG. 1, the PMC further includes storage module 101 (that may store data such as the entities' criticality weights, IPs criticality weights, the so determined risks' criticality scores, and/or others), as well as interface module 102 for I/O data.

Operation of system 10, PMC 11 and the functional modules therein will be further detailed with reference to FIG. 2 and onwards below.

Note that the invention is not bound by the specified modules, and the various sequence operations described with reference to various embodiments herein may be implemented by modified or different modules than those described with reference to FIG. 1.

It is noted that the teachings of the presently disclosed subject matter are not bound by the cyber security system described with reference to FIG. 1. Equivalent and/or modified functionality can be consolidated or divided in another manner and can be implemented in any appropriate combination of software with firmware and/or hardware and executed on a suitable device. The cyber security system can be a standalone, or integrated, fully or partly, with other system(s). Those skilled in the art will also readily appreciate that the data repositories can be consolidated or divided in other manner, and that databases can be shared with other systems, or be provided by other systems, including third party equipment.

Bearing this is mind, attention is drawn to FIG. 2 which illustrates a generalized flow-chart of a sequence of operations performed by a cyber security system 10, in accordance with certain embodiments of the presently disclosed subject matter. Thus, at the onset at stage 210, passive scanning is applied by utilizing e.g. a scanner module or modules depicted in FIG. 1 e.g. under the control of scanner manager 17 and Orchestrator 18 for detecting risks derived from vulnerabilities and misconfigurations.

Thus, in accordance with certain embodiments at a first stage, a set of IP addresses of interest is determined, by using services such as a national ISP database. The set may be composed of e.g. a range or e.g. one or more ranges of IP addresses, etc. For simplicity, the term IP address range may be used herein, but it should be understood as a non-limiting example of an IP address set. Then, each of the IP addresses in the range is scanned using the specified scanning module (s) for determining risks that are derived from vulnerabilities and misconfigurations of (passively accessed) network assets that are associated with the scanned IP address. At this stage, the system may utilize the scanner modules based on Internet-wide search engines (operating independently in mapping the network). The so detected risks are a priori known such as CVE-2019-8454, and their associated respective risk criticality scores are extracted (a non-limiting example being the known per se National Institution of Standards and Technology-NIST data source). The specified criticality scores may fall in the range of 1-10, where, say "1" represents the least critical risk and "10" represents the most critical risk.

The scanner module may also reveal risks derived from misconfigurations, for instance, ports that should not be "open" for a given IP address according to a predefined cybersecurity policy. The risks derived from misconfigurations may result in corresponding misconfiguration scores, where, for example, for a given IP address, a misconfiguration score aggregates the values associated with every port thereof (note that there may be tens of thousands of ports associated with an IP address). For instance, each scanned port may be assigned with a "1" value if it is in "open" state, in contradiction to a cyber security policy that prescribed that this particular port should be closed, or say a "0" value for an authorized open port (according to the specified policy), or if it is in "closed" state. The misconfiguration score for the specified IP address may be composed of applying an aggregation function (say Sum) to the specified values, namely summing the values associated with all the scanned ports associated with a given IP address and the resulting sum total may be normalized (to, say the range of 1-10), giving rise to a misconfiguration score per scanned IP address.

The invention is of course not bound by the specific manner of determining a risk criticality score (for revealed risks that are derived from vulnerabilities) or misconfiguration score (for revealed risks that are derived from misconfigurations) and obviously not to the usage of a given aggregation function and/or to the specified score range (1-10), all provided by way of example only.

Note that the relevant data such as the predefined risk definitions, their associated risk criticality scores, data informative of the cyber security policy, the resulting calculated risk criticality scores and risk misconfiguration scores, may be stored in data repository module 101.

Note also that whereas the description above referred to the use of one scanning module (e.g. a Shodan scanner), two or more scanning modules may be utilized, each designated to determine a possibly predefined set of risks in order to obtain broader coverage of the risks associated with the scanned range IP addresses. In accordance with certain embodiments, the two or more scanning modules (referred to also as tools) may cover "non-overlapping" risks and/or in accordance with other examples, partially or fully overlapping risks, all depending upon the particular applications. For instance, two or more scanners may be designated to reveal the specified CVE-2019-8454 risk. As will be explained in greater detail below, the scanning tools may be associated with respective scanning tool scores being informative of their quality and/or accuracy. The specified scanner scores may be taken into account in the calculating of the consolidated risk score per entity, all as described with reference to computational stage 240, below.

The net effect is, thus, that following this passive scanning stage, for each IP address in the range, risks that are derived from vulnerabilities are identified, and their corresponding risk criticality scores are extracted, as well as risks that are derived from misconfigurations are determined, and their corresponding risk misconfiguration scores are calculated.

Turning now to step 220, it concerns mapping of scanned IP addresses (of the specified range of IP addresses) to entities of interest (e.g. organizations, such as banks, governmental institutes, given private companies, and so forth). In accordance with certain embodiments, this may involve utilizing supplemental data sources, possibly including national/state registry such as WhoIs data source for mapping Domain Names, a DNS repository, and/or known intelligence cyber repositories, etc., all facilitating correlation of IP address to entities. The invention is, of course, not bound by these examples.

The mapping stage may be performed e.g. by Entity Manager module 19 (of FIG. 1) and may include correlating the output of the passive scanners and generating an integrated network footprint of entities. In accordance with certain embodiments, this footprint may be analysed and correlated with the existing entities to identify gaps in mapping: for instance, either entities that were not mapped, entities that were mapped but do not exist in the registry or devices, and hosts that are not identified as corporate networks, but pose utilizing threats and security gaps.

In accordance with certain embodiments, the mapping stage 220 may further involve misconfiguration scores enhancement. As may be recalled, in accordance with certain embodiments, the misconfiguration score associated with a given IP address, as determined at the passive scanning stage, included aggregating the misconfiguration values per scanned port focusing on open ports that violate the cyber security policy. Thus, after having mapped the entities of interest to their associated IP addresses, there is more information that may be obtained with respect to the network assets that are associated with ports of a given IP address. Consider, for example, a given "open" port #i of IP address #j which was assigned (at the passive scanning stage (210) with the misconfiguration value "0" as it complied with the cyber security policy because the port #i is associated with a network asset=server that is allowed, according to the policy, to be "open". However, after the IP address #j has been mapped to a given entity, further scanning of the port reveals that the network asset "server" is a SCADA database server which is more sensitive and may be exploited, and consequently the cyber security policy prescribes that this port #i is not allowed to be open. Consequently, its associated misconfiguration value is changed from "0" to "1". This additional ports scanning procedure may be applied to some or all of the ports of selected or all IP addresses, leading to possible modification of misconfiguration values from "0" to "1", or vice versa. The change in the misconfiguration values may give rise to a corresponding change of the calculated misconfiguration score as exemplified above, giving rise to more accurate misconfiguration scores.

Moving on to step 230, pro-active scanning (active scan)—in this stage the system activates a set of advanced and active scanners (utilizing e.g. different scanner modules e.g. Tenable Nessus) designated in FIG. 1, under, say, the control of Scanner Manager 17 and Orchestrator 18) that try to identify risks in a more advanced manner, e.g. map exploitable vulnerabilities by activating access attempts or simulating attack scenarios against specific entities. Note that unlike the passive scan stage, in the active scan stage the entities that are associated with the IP addresses, and therefore additional information, may be obtained (e.g. better knowledge of network assets associated with the entity through the IP address, or other information that is obtainable by virtue of the mapping between the entity and the IP address) are already known, and the entity's operator, who may allow a proactive testing such as launching simulated attack scenarios that cannot be implemented at the passive scanning stage. The utilization of the advanced scanning tools with the permission of the entity's operator may result in enhancing (e.g. more accurate) criticality and/or misconfiguration scores than those obtained at the passive scanning stage, and may reveal risks that are derived from vulnerabilities/misconfigurations that cannot be identified at the passive stage. Permission and allowance are used to express consent of the operator. Operator should be construed broadly to cover anyone who has control and/or authority to allow actions in connection with at least the active scanning.

Consider, by way of example, a given risk, say "CVE-2020-8300" that was identified with respect to a given IP address, and its associated risk criticality score was extracted (say "6" on a scale of 1-10). Consider now that for the purpose of the active scanning stage, the entity's operator allows to install an agent at an entity's network asset, and that this agent attempts to exploit the vulnerabilities that stem from the specified identified risk by launching a customized cyber-attack. Assuming, for sake of discussion, that the attempt to exploit this risk fails, and no network asset that is associated to this IP address is compromised, because there is another layer of protection (that is not accessible by applying the passive scanning) which blocked any exploitation attempt. The latter is a non-limiting example of the additional information. The net effect will be that this identified risk (at the passive scanning phase) which turned out, at the active scanning stage, to have no harmful effect, will be removed from the list of risks, and its associated criticality score will not be taken into consideration in the following analysis phase of calculating the consolidated risk score.

By way of another example, with the consent of the entity's supervisor, hundreds of emails, each contaminated with a different virus, are sent to a given IP address associated with the entity's mail server. Further assume that a few of the viruses manage to penetrate and inflict simulated damage to some entity's network assets (the latter is another non-limiting example of the additional information). This may cue on risks (from the specified known list of risks) that are derived from vulnerabilities that cannot be identified by the applying passive scanning phase, as this kind of simulated attack must require the entity supervisor's consent. Accordingly, a new set of risks and their corresponding risk criticality scores may be added, giving rise to modified and more accurate list of criticality scores that will later affect the calculating of the consolidated risk score.

The invention is of course not bound by the specified specific examples which are provided in a non-limiting manner for clarity of explanation.

The so determined modified criticality scores and modified misconfiguration scores (if any) may be stored in the data repository (101) for subsequent analysis processes, as will be described below.

An example of active scanning is e.g. Tenable Nessus. Note that the active scanning stage 230 is based on already mapped IP addresses to their respective entities as a result of the mapping stage 220.

While the description above exemplified two phases of scanning, namely a passive scanning followed by an active scanning (the latter is based on already available mapping of IP addresses to entities), the invention is not bound by these examples, and, accordingly, the scanning step may involve more scanning stages and/or modified scanning stages, not necessarily the specified passive and active scanning, as long as the input for the next analysis phase (described below e.g. with reference to stage 240) will provide data informative of risks (and their corresponding scores) derived from vulnerabilities and misconfiguration of IP addresses associated with entities.

Next, there follows a stage consolidated risk score calculation and possibly issuance of reports (step 240) utilizing e.g. Exposure Risk factor Analysis module 100. In accordance with certain embodiments, the system processes the information gathered in the previous stages and may generate two products:

Consolidated risk score which is a variable measure representing, intuitively, its exposure to exploits, and optionally:

Detailed report e.g. for each organization providing a list of the detected risks and recommendations for mitigation activities. For instance, the recommendations can be closing certain ports, disabling certain services, or upgrading certain components.

Turning to the consolidated risk score calculation, in accordance with certain embodiments the following sequence of operations apply per entity of interest: (see FIG. 3).

Obtaining IP address criticality weights associated respectively with the plurality of IP addresses (301) that are associated with the entity; each IP address criticality weight being informative of the IP address's sensitivity to cyber threats relative to the sensitivity of other IP addresses to cyber threats. In accordance with various embodiments, this data is a priori determined and may be stored in data repository 101 for further usage.

Providing entity criticality weights associated respectively with the entities (302); each entity criticality weight being informative of the entity's sensitivity to cyber threats relative to the sensitivity of other IP addresses to cyber threats. In accordance with various embodiments, this data is apriori determined (and may be stored in data repository 101 for further usage).

Next (303), determining, for the entity, a consolidated risk score based on at least (i) the risk criticality scores of the risks identified with respect to each IP addresses of the entity (as determined e.g. in steps 210 to 230 discussed above) (ii) the misconfiguration scores associated with the IP addresses of the entity (as determined e.g. in steps 210 to 230 discussed above); (iii) the respective criticality weights of the IP addresses associated with the entity (as extracted e.g. from say data repository 101), and (iv) the entity criticality weight of the entity (as extracted e.g. from say data repository 101).

Bearing this in mind, in accordance with certain embodiments, calculating of the consolidated entity risk score includes:

a. for each IP address associated with the entity:=
   i. calculate an IP address risk score by combining (say weighted average) at least the (i) risk criticality scores associated with the IP address, (ii) misconfiguration score associated with the IP address, and (iii) IP address criticality weight of the IP address
b. combine the (i) calculated IP address risk scores of the respective IP addresses that are associated with the entity and (ii) entity criticality weight, giving rise to the consolidated risk score per entity.

In accordance with certain embodiments, in addition to the entity criticality weight and IP address criticality weight, the entity's consolidated risk score (for each risk) may be further based on the scanning tool weight. As may be recalled, the scanning stage was performed by scanning tool(s) (designated e.g. as a scanning module(s) in FIG. 1). The tool weight is informative of the reliability of the tool in detecting risks, where the higher the factor, the more reliable/accurate is the tool.

In accordance with certain embodiments, as an interim stage for determining the entity's consolidated risk score, each calculated IP addresses risk score (of IP addresses associated with the entity) is based also on the specified scanning tool(s) weight(s) (of the scanning tools that was (were) used for scanning the IP address for determining the corresponding risk criticality scores and misconfiguration scores).

For a better understanding of the foregoing, consider the following non-limiting simplified example:

Assume for simplicity that all the values fall in (or normalized to) the range of 1 . . . 10. Thus, A high-risk organization (Org A) will get an entity criticality weight of 8 vs. a civil organization (Org B) that will get an entity criticality weight of 2.

Org A is associated with, by this example, only one (critical) IP address that gets an IP address criticality weight of 7.

Org B is associated with, by this example, only one (non-critical) IP address that gets an IP address criticality weight of 1.

Assume that two scanning modules are used, Shodan having a tool weight of 8, and a BinaryEdge scanning tool, which will get a tool weight of 6.

Assume that the normalized misconfiguration score for the critical IP address (of Org A) is 8, and for the non-critical IP address (of Org B) it is 3.

Assume that one risk is identified for the critical IP address (of Org A), say "CVE-2019-8454" having a risk criticality score of 7 by utilizing the Shodan scanning tool, and another risk, say the "CVE-2020-8300" having a risk criticality score of 4, is identified for the non-critical IP address (of Org B) using the BinaryEdge scanning tool.

Further assume that combining the specified parameters for calculating a corresponding IP risk score is based on a weighted average function, where each of the IP address criticality weight, misconfiguration score and risk criticality score gets a weight of $\frac{1}{3}$, and wherein, for example, the tool weight affects 10% of the risk criticality score and the latter contributes the other 90 percent.

Thus, combining $\frac{1}{3}$*(IP address criticality weight=7)+$\frac{1}{3}$* (misconfiguration score=8)+$\frac{1}{3}$*(0.1*tool weight=8+ 0.9*risk criticality score=7), will result in an IP risk score of 7.36 for the criticalIP address.

Considering that by this example Org A is associated with only one IP address ("the critical IP address), then the specified IP risk score is regarded as consolidated IP risk score. Further assume that the combination of the consolidated IP risk score and the entity criticality weight is based on a weighted average (say 90% for the consolidated IP risk score and 10% for entity criticality weight), then Org A's entity consolidated risk score is 0.9*7.36+0.1*8=7.42

Similarly, Org B's entity consolidated risk score would be:

$$1/3*(IP \text{ address criticality weight} = 1) +$$
$$1/3*(\text{misconfiguration score} = 3) +$$
$$1/3*(0.1*\text{tool weight} = 6 + 0.9*\text{risk criticality score} = 4) = 2.73$$
$$2.73*0.9 + 0.1*2 = 2.66$$

In this example the consolidated risk score of Org A is much higher than Org B. This means that, for instance, more attention and more resources should preferably be applied, to mitigate the risks of Org A.

Those versed in the art will readily appreciate that the specified numerical values are provided for illustrative purposes only and are by no means binding.

It should be further noted that by this example the consolidated entity risk score was calculated with respect to one IP address, and one risk and was based on the entity criticality weight, the IP address criticality weight and the tool weight. It should be further noted that, by this example, the entity does not have associated sub entities.

In case of modified embodiments, one or more of the following non-limiting variants may apply: (i) other weighted parameters which are not an entity, IP address and tool may be further considered, e.g., industry of an entity can be a parameter that can be scored, time can be a parameter (holidays, special event etc.) that can be scored, (ii) tool weight is not considered (iii) more than one risk is considered (iv) more than one IP address is considered, and/or many others.

The "combining" operation specified above may be implemented by applying a selected operation or operations (say one or more of: average, weighted average, max, sum and/or or any other selected operation, depending upon the particular application). Thus, by way of non-limiting example, in case that another risk (other than the specified "CVE-2019-8454" risk, which, as recalled, had a risk criticality core=7) is identified during the scanning of the critical IP address associated with Org. A, and assuming that its extracted risk criticality score is, say, 5, then the risk criticality score that is considered for calculating the IP address risk score of the critical IP address associated with of Org. A may be, say, an average between the two extracted risk criticality scores (i.e. an average between 7 and 5).

Moving in with this example, in certain embodiments, where more than one IP address is associated to an entity, then the specified calculation of the IP risk score may be applied for each IP address and combined (e.g., average, max or any other selected operation(s), whichever the case may be), to give rise to the consolidatedIP risk score, and calculating therefrom the consolidated risk score, all as explained above.

By yet another non-limiting example, in case the entity is associated with one or more sub entities, then each sub-entity may be associated with a respective sub-entity weight and with a respective group of one or more IP addresses. The calculation described above with reference to an entity may be performed with respect to each sub-entity, giving rise to a consolidated risk score for each sub-entity (taking into account also its corresponding sub entity criticality weight) and then the respective consolidated risk scores may be combined (e.g., average, max, or any other selected operation(s), whichever the case may be) to obtain the entity consolidated risk score (taking into account also the entity criticality weight).

In accordance with certain embodiments where the group of entities is composed of a hierarchy of layers of sub-entities, the calculation may be performed layer-wise, mutatis mutandis.

All of the above are non-limiting examples of calculating the entity's consolidated risk score based on at least the risk criticality score (one or more), the entity criticality weight and IP address criticality weight (one or more), misconfiguration scores, and, in certain examples, also the tool weight (one or more). The invention is not bound by the specified parameters or the manner of calculating the entity(s) consolidated risk scores.

Attention is now drawn to FIG. 4 illustrating graphically a risk factor calculation paradigm, in accordance with certain embodiments of the presently disclosed subject matter. The chart is provided for clarity of explanation only.

The Risk Score Analysis may be based on a unique approach of calculating three matrixes:

Entity characteristics data (401)—represents the specific characteristics of an entity, e.g., the IP addresses that are mapped to the respective entity and described for instance with reference to the mapping stage 220 of FIG. 2).

Vulnerability and misconfiguration data (402)—represents the results of the different scans, for instance the risk criticality scores and misconfiguration scores or risks that are derived from vulnerabilities and misconfigurations, obtained as a result of the scanning (described for instance with reference to the scanning stages 210 and 230 FIG. 2).

Weight data (403)—represents the weights the system analyst defined as different entity types, IP address types, and possibly different scanners. This weight data may provide the adjustments for the correlation between a specific entity/IP address and the scan results.

By utilizing this approach, the system and method in accordance with certain embodiments of the invention generate a "tailored risk mapping" for scanned risks of an entity, rather than the standard risk assessment tools that do not take into consideration the unique characteristics of each entity and/or IP addresses(s), constituting thus an advantage over hitherto known solutions.

In accordance with certain embodiments of the invention, this approach will provide different weights to different risks according to the entity's characteristics, thereby defining the risk by correlating the technical aspects and business impact and allowing more accurate prioritization of the risks, and allowing the entity to focus on the most critical risks. The risk factor is calculated by taking into consideration the potential impact of vulnerability which is derived from the purpose of the system behind the IP, the nature of the entity (what is the main business of the entity and how this vulnerability can impact the business), and the accumulated number of vulnerabilities and their impact. By way of example of the above, in case of a risk that turns out to impact the entity's business, say an essential production line of an entity, say a dairy facility, the weight associated with the entity may be set to a higher value thereby leading (eventually) to a higher calculated consolidate risk score of the entity.

By way of another example, a bank whose business relies on effective IT systems, will be evaluated with a different weight matrix than a water purification plant which relies on a highly secure OT system to avoid any threat actor from manipulating the purification machinery. The result is that for the same set of detected vulnerabilities (risks), each entity may get an entirely different consolidated risk score due to the actual nature of the threat to each entity, where, for example, the consolidated risk score for the bank will be higher than that of the water purification plant. This will allow the relevant decision maker to take action, based on the consolidated risk score of each entity, considering that the consolidated risk score r for each entity correctly represents the risk to be exposed to cyber attack, and its potential implication for the entity.

The consolidated risk score will enable presenting a more accurate cyber risks assessment of the entities, prioritizing the allocation of resources for mitigating the risks, and better monitoring of the mitigation steps performed by the entities.

Figure 5:
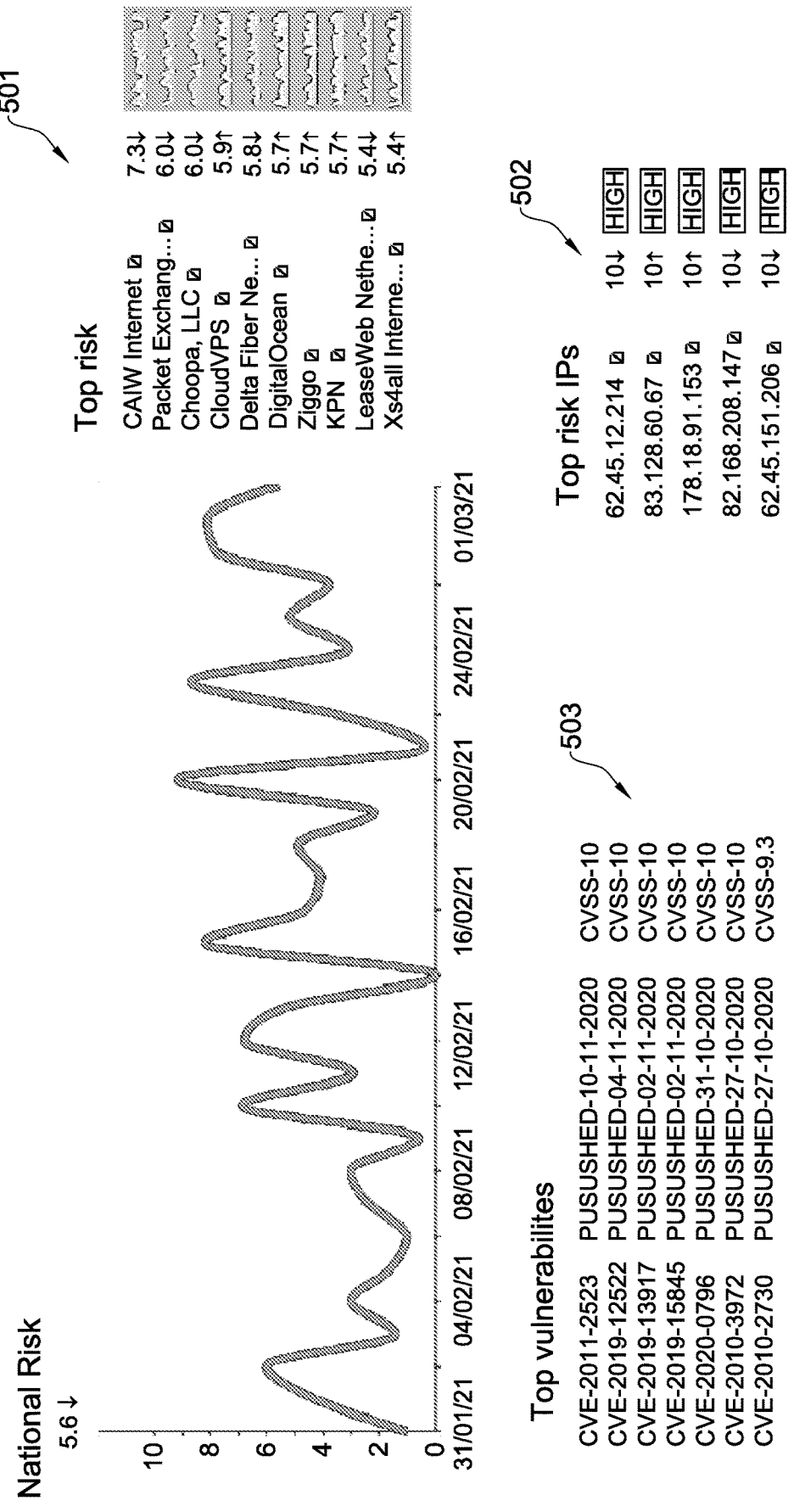
FIG. 5 illustrates an example of calculated consolidated risk scores, in accordance with certain embodiments of the presently disclosed subject matter.

Turning now to FIG. 5, this illustrates an example of a screen shot indicating various system outputs in accordance with certain embodiments of the presently disclosed subject matter. Thus, in 501 the consolidated risk score is shown for various entities. In 502, a list of IP addresses with their respective (high) scores is shown, and in 503 a list of risks (various CVEs) with their respective risk criticality scores (marked as CVSS and associate risk score) is shown. The invention is of course not bound by this example and accordingly modified information and/or additional data may be displayed (e.g. national risk indication composed of, say weighted average of "the monitored consolidated risk scores) and or fed to other systems (e.g. for performing actions, based on the output data), all depending upon the particular application.

It is noted that the teachings of the presently disclosed subject matter are not bound by the flow chart illustrated in FIGS. 2 and/or 3, and that the illustrated operations can occur out of the illustrated order. It is also noted that whilst the flow chart is described with reference to elements of system (100), this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized cyber security system for generating a consolidated risk score of an entity, usable for analysing the vulnerabilities of plurality of entities to cyber risks, the computerized cyber security system comprising a processor and memory circuitry (PMC) configured to:

determine a first set of IP addresses for scanning;

scan the first set of IP addresses, and for each IP address in the set, and perform, including:

(1) identify at least one risk and extract corresponding at least one risk criticality score, wherein each risk criticality score is informative of the vulnerability of network assets associated with the IP address to the risk;

(2) determining a misconfiguration score being informative of the vulnerability of network assets associated with the IP address to a misconfiguration;

map a second set of IP addresses, of said first set, to at least one entity of interest, wherein each one of said entities of interest is associated with a respective subset of IP addresses of said second set;

provide IP address criticality weights associated respectively with said second set of IP addresses, each IP address criticality weight being informative of the IP address's sensitivity to cyber threats relative to the sensitivity of other IP addresses to the cyber threats;

provide an entity criticality weight associated respectively with said at least one entity of interest; the entity criticality weight being informative of the entity's sensitivity to cyber threats, and being distinct from the sensitivity to cyber threats of the IP addresses of the entity, relative to the sensitivity of other entities to cyber threats;

wherein said scanning is performed by at least two scan tools each configured to obtain a subset of said set of risks and wherein each scan tool is associated with a respective tool weight, being informative of the reliability of the tool in detecting risks, for each entity of interest, determine an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, (iv) the entity criticality weight of the entity of interest, and (v) the corresponding tool weight of the tool that was used for the scanning, thereby obtaining a plurality of entity consolidated risk scores associated with respective entities of interest.

2. The computerized cyber security system of claim 1, wherein, for each entity of interest, the PMC is configured to determine the IP risk scores of respective IP addresses associated with the entity of interest, wherein each IP address risk score of an IP address is determined by combining at least (i) the risk criticality scores associated with the IP address (ii) the misconfiguration score associated with the IP address, and (iii) IP criticality weight associated with the IP address, and wherein said PMC is further configured to determine said consolidated risk score per each entity of interest by combining the determined IP address risk scores of the respective IP addresses that are associated with the entity (iv) entity criticality weight of the entity of interest and (v) the corresponding tool weight of the tool that was used for the scanning.

3. The computerized cyber security system of claim 1 wherein said PMC is further configured to actively scan said second set of mapped IP addresses by utilizing additional information derived from the mapped IP address to the entity of interest and the entity operator's consent scanning the IP address, to thereby enhance said risk criticality scores and misconfiguration scores.

4. The computerized cyber security system of claim 3, wherein a tool of said tools is Shodan.

5. The computerized cyber security system of claim 1, wherein each IP address is associated with a plurality of ports and wherein said scan includes determining a respective port value for each scan port, wherein each port value is informative of whether the "open ports" comply with a policy, and wherein said misconfiguration associated with an IP address is determined by combining the port values of the ports associated with the IP address.

6. The computerized cyber security system of claim 1, wherein said combining includes using one or more of the following functions: average, weighted average, sum, and max.

7. The computerized cyber security system of claim 1, wherein said first set of IP addresses is obtained using at least a national ISP data source.

8. The computerized cyber security system of claim 1, wherein said mapping utilizes at least the WhoIs and DNS repository data sources.

9. The computerized cyber security system of claim 1, wherein said risk criticality scores that are associated with the respective known risks comply with the National Institute of Standards and Technology (NIST) data source.

10. A computerized cyber security method for generating a consolidated risk score of an entity, usable for analysing the vulnerabilities of plurality of entities to cyber risks, the computerized cyber security method comprising:

(a) determining a first set of IP addresses for scanning;

(b) scanning the first set of IP addresses, and for each IP address in the set, and perform, including:

(1) identify at least one risk, and extract corresponding at least one risk criticality score, wherein each risk criticality score is informative of the vulnerability of network assets associated with the IP address to the risk;

(2) determining a misconfiguration score being informative of the vulnerability of network assets associated with the IP address to a misconfiguration;

(c) mapping a second set of IP addresses, of said first set, to at least one entity of interest, wherein each one of said entities of interest is associated with a respective sub-set of IP addresses of said second set;

(d) providing IP address criticality weights associated respectively with said second set of IP addresses; each IP address criticality weight being informative of the IP address's sensitivity to cyber threats relative to the sensitivity of other IP addresses to the cyber threats;

(e) providing an entity criticality weight associated respectively with said at least one entity of interest; the entity criticality weight being informative of the entity's sensitivity to cyber threats, and being distinct from the sensitivity to cyber threats of the IP addresses of the entity, relative to the sensitivity of other entities to cyber threats;

wherein said scanning is performed by at least two scan tools each configured to obtain a subset of said set of risks and wherein each scan tool is associated with a respective tool weight, being informative of the reliability of the tool in detecting risks, and for each entity of interest, (f) determining an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, (iv) the entity criticality weight of the entity of interest, and (v) the corresponding tool weight of the tool that was used for the scanning, thereby obtaining a plurality of entity consolidated risk scores associated with respective entities of interest.

11. The computerized cyber security method of claim 10, further comprising:

for each entity of interest, determining IP risk scores of respective IP addresses associated with the entity of interest, wherein each IP address risk score of an IP address is determined by combining at least (i) the risk criticality scores associated with the IP address (ii) the misconfiguration score associated with the IP address, and (iii) IP criticality weight associated with the IP address, and determining said consolidated risk score per for each entity of interest by combining the determined IP address risk scores of the respective IP addresses that are associated with the entity (iv) entity criticality weight of the entity of interest and (v) the corresponding tool weight of the tool that was used for the scanning.

12. The computerized cyber security method of claim 10, further comprising: actively scanning said second set of mapped IP addresses by utilizing additional information derived from the mapped IP address to the entity of interest and the entity operator's consent scanning the IP address, to thereby enhance said risk criticality scores and misconfiguration scores.

13. The computerized cyber security method of claim 12, wherein a tool of said tools is Shodan.

14. The computerized cyber security method of claim 10, wherein each IP address is associated with a plurality of ports and wherein said scanning includes determining a respective port value for each scan port, wherein each port value is informative of whether the "open ports" comply with a policy, and wherein said misconfiguration associated with an IP address is determined by combining the port values of the ports associated with the IP address.

15. The computerized cyber security method of claim 10, wherein said combining includes using one or more of the following functions: average, weighted average, sum, and max.

16. The computerized cyber security method of claim 10, wherein said first set of IP addresses is obtained using at least a national ISP data source.

17. The computerized cyber security method of claim 10, wherein said mapping utilizes at least the WhoIs and DNS repository data sources.

18. The computerized cyber security method of claim 10, wherein said risk criticality scores that are associated with the respective known risks comply with the National Institute of Standards and Technology (NIST) data source.

19. A non-transitory program storage device readable by a computer, tangibly embodying computer readable instructions executable by the computer to perform a method of generating a consolidated risk score of an entity, usable for analysing the vulnerabilities of plurality of entities to cyber risks, the method comprising:

(a) determining a first set of IP addresses for scanning;

(b) scanning the first set of IP addresses, and for each IP address in the set, perform, including:

(1) identify at least one risk and extract corresponding at least one risk criticality score, wherein each risk criticality score is informative of the vulnerability of network assets associated with the IP address to the risk;

(2) determining a misconfiguration score being informative of the vulnerability of network assets associated with the IP address to a misconfiguration;

(c) mapping a second set of IP addresses, of said first set, to at least one entity of interest, wherein each one of said entities of interest is associated with a respective sub-set of IP addresses of said second set;

(d) providing IP address criticality weights associated respectively with said second set of IP addresses; each IP address criticality weight being informative of the IP address's sensitivity to cyber threats relative to the sensitivity of other IP addresses to the cyber threats;

(e) providing an entity criticality weight associated respectively with said at least one entity of interest; the entity criticality weight being informative of the entity's sensitivity to cyber threat, and being distinct from the sensitivity to cyber threats of the IP addresses of the entity, relative to the sensitivity of other entities to cyber threats;

wherein said scanning is performed by at least two scan tools each configured to obtain a subset of said set of risks and wherein each scan tool is associated with a respective tool weight, being informative of the reliability of the tool in detecting risks, and for each entity of interest, (f) determining an entity consolidated risk score based on at least (i) the risk criticality scores associated with the IP addresses of the entity of interest, (ii) the misconfiguration scores associated with the IP addresses of the entity of interest (iii) IP criticality weights associated with the IP addresses of the entity of interest, (iv) the entity criticality weight of the entity of interest, and (v) the corresponding tool weight of the tool that was used for the scanning, thereby obtaining a plurality of entity consolidated risk scores associated with respective entities of interest.

* * * * *